(No Model.)

T. MAYES.
BAKING PAN AND COVER.

No. 313,092. Patented Mar. 3, 1885.

WITNESSES

INVENTOR
Thomas Mayes
By his Attorney
John Rennie

United States Patent Office.

THOMAS MAYES, OF ALBANY, NEW YORK.

BAKING PAN AND COVER.

SPECIFICATION forming part of Letters Patent No. 313,092, dated March 3, 1885.

Application filed November 22, 1884. (No model.)

*To all whom it may concern:*

Be it known that I, THOMAS MAYES, a citizen of the United States, residing at Albany, in the county of Albany and State of New York, have invented certain new and useful Improvements in Bread-Baking Pan and Cover; and I do hereby declare the following to be a full, clear, and exact description of the invention, such as will enable others skilled in the art to which it appertains to make and use the same.

The object of my invention is to produce a bread-baking pan of such construction as to impress upon or print into the soft dough, filling it with a series of equally-spaced parallel transverse surface-grooves or indentations extending across the bottom and sides of the same, and which, reproduced in the finished loaf, will serve as guides for the unskillful in cutting the said loaf into slices of uniform thickness.

My invention consists, furthermore, in a suitable cover for the baking-pan, provided with vent-openings, and with means for continuing the indentations made by the pan itself across the top of the loaf, thereby making a series of continuous circumscribing lines.

Figure 1:
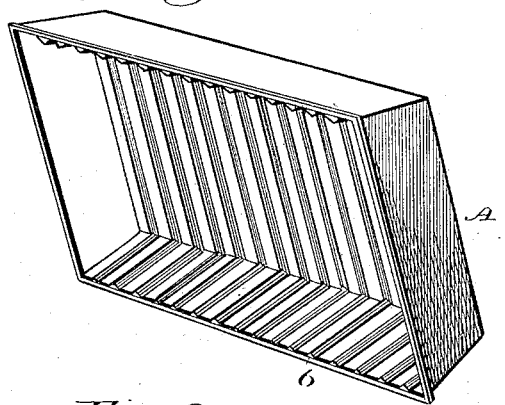
Figure 2:
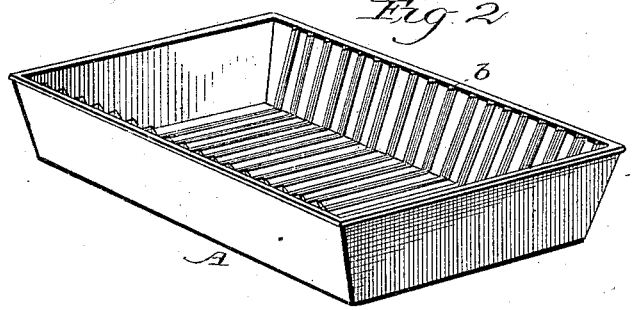
Figure 3:
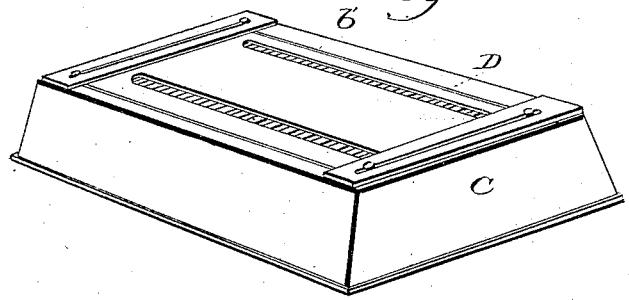

In the accompanying drawings, forming a part of this application, and wherein like letters indicate like parts, Figure 1 represents in perspective a side interior view of my improved pan. Fig. 2 represents a similar view at a different angle of observation. Fig. 3 represents in perspective a bottom view of the pan-cover.

A indicates a bread-pan of any suitable shape and dimensions. The said pan is provided at equal distances from each other with a set or series of transverse corrugations or raised portions, $b$, consisting, preferably, of ridge shaped projections triangular in cross-section, as shown. These projections may be stamped or struck up from the surface of the pan during the manufacture of the latter, or they may be soldered or otherwise affixed to the sides and bottoms of the ordinary smooth pans in general use.

C represents the pan-cover, provided on its inner basal surface with similar projections, $b'$. The cover is of such a width and length as to fit accurately over the upper edges of the pan and in such manner that the projections $b'$ shall come each in line with a corresponding projection of the pan. Vent-openings D, preferably longitudinal, as shown, are provided in said cover for the escape of vaporous exhalations during the baking operation.

The parts being constructed as described, the mode of procedure is as follows: The dough formed to fit the pan is placed therein by the baker, and by its own weight or with slight hand-pressure the raised projections or corrugations $b$ enter it, forming a series of equally-distant indentations. If it is desired to continue these indentations upon the top of the loaf, the cover is put on and pressed down gently until the corrugations $b'$ enter the said top a sufficient distance. The pan, either with or without the cover, according as it is desired to mark the loaf partially or completely around, is then placed in the oven and baked in the usual manner.

Loaves produced in accordance with my invention are especially desirable where bread rations of a determinate quantity are required to be served, as in jails, work-houses, the commissary departments of the army and navy, &c.

My invention also affords an easy method of subdividing loaves with precision where the purchaser desires less than a whole one, wholly inexperienced persons being enabled by means of the sectional guiding-grooves to cut the loaf with accuracy and celerity.

I am aware of Patent No. 246,194, for a waffle-iron, granted to A. G. Patton, August 23, 1881, wherein intersecting ribs are shown which divide the waffle into exact sections, and do not lay claim to such construction.

Having thus described my invention, what I claim, and desire to secure by Letters Patent, is—

1. A pan for baking bread, provided with a series of transverse corrugations or projections, substantially as described.

2. A pan for baking bread, provided with a series of transverse corrugations or projections, in combination with a cover having like projections corresponding in location with those of the pan, and with vent-openings, substantially as described.

In testimony whereof I affix my signature in presence of two witnesses.

THOMAS MAYES.

Witnesses:
CLEMENT WARREN,
AARON B. PRATT.